350-371 SR
XR 3,851,192 0220 940234 X 4034D

United States Patent [19]

Flippen et al.

[11] 3,851,192
[45] Nov. 26, 1974

[54] ELECTROMECHANICAL TRANSDUCERS USING COUPLED FERROELECTRIC-FERROELASTIC CRYSTALS

[75] Inventors: Richard B. Flippen; Edward M. Hogan, both of Wilmington, Del.

[73] Assignee: E. I. du Pont de Nemours and Company, Wilmington, Del.

[22] Filed: Dec. 27, 1973

[21] Appl. No.: 428,717

[52] U.S. Cl. .................. 310/8, 310/9.5, 310/8.3, 310/8.1, 252/62.9, 350/150
[51] Int. Cl. .................. H01v 7/02, H04r 17/00
[58] Field of Search ......... 310/8, 9.5, 9.6; 252/62.9; 423/263, 593; 350/150

[56] References Cited

UNITED STATES PATENTS

| | | | |
|---|---|---|---|
| 3,437,432 | 4/1969 | Borchardt | 310/9.5 X |
| 3,773,898 | 11/1973 | Aizu et al. | 252/62.9 X |

OTHER PUBLICATIONS

J. Phys. Soc. Japan, 27(1969) 511. Simultaneous Ferroelectricity and Ferroelasticity of GMO by Aizu et al., (QC 1. N5).

J. Phys. Soc. Japan, 27(1969) 387. Possible Species of "Ferroelastic" and Simultaneously Ferroelastic and Ferroelectric Crystals by Aizu.

Applied Physics Letters 8 (1966). GMO: A Ferroelectric Laser Host, by Borchardt et al. (QC1 A 745).

*Primary Examiner*—Mark O. Budd

[57] ABSTRACT

The coupled ferroelectric-ferroelastic properties of crystals such as gadolinium molybdate are used to provide an effectively high-compliance mechanical-electrical transducer whereby mechanical displacement of the crystal results in displacement of a zigzag domain wall. Charge proportional to the displacement flows between electrodes on the two surfaces of the crystal intersected by the wall through an electrical impedance analogous to the mechanical function. Appropriate voltage is developed or supplied across the impedance to measure or develop the mechanical function.

9 Claims, 5 Drawing Figures

3851192
OR IN 310/310

ELECTROMECHANICAL TRANSDUCERS USING COUPLED FERROELECTRIC-FERROELASTIC CRYSTALS

BACKGROUND OF THE INVENTION

1. Field of the Invention

This invention relates to a transducer for converting mechanical displacement, velocity and acceleration to an electrical voltage and vice versa.

2. The Prior Art

A transducer can be defined as a means by which energy can flow from one or more transmission systems to one or more other transmission systems.

The present invention is directed to electromechanical transducers wherein a mechanical function is converted to an electrical function and vice versa.

Known transducers for such applications employ such effects as the piezoelectric effect. In general, they can be considered as of low compliance in the sense that in the absence of applied force, they revert to the initial condition with a large restoring force. Further, such devices generally have a relatively low electrical output for a given applied stress.

Heretofore, it was known that the mechanical and electrical switching properties in ferroelectric/ferroelastic crystals were intimately coupled as taught by Aizu, J. Phys. Soc. Japan, 27, 387 (1969). The present invention utilizes these properties to provide an electromechanical transducer having high compliance in the sense that there is no inherent mechanical restoring force, and a high electrical output for a given mechanical function.

SUMMARY OF THE INVENTION

The present invention comprises an electromechanical transducer comprising a plate of a coupled ferroelectric/ferroelastic crystal exhibiting uniaxial properties, preferably, gadolinium molybdate; the plate being cut so that the faces thereof are essentially perpendicular to the plane of the domain walls of the crystal. The plate is equipped with two electrodes on the opposing faces and is divided into two domains by a zigzag domain wall.

A mechanical system is coupled to the plate to produce stress parallel to the domain wall whereby the domain wall motion is correlated with the mechanical function.

The electroded surfaces are connected in a circuit including a series of electrical impedance analogous to the impendance of the selected mechanical functions, whereby an electrical voltage across said electrical impedance is correlated with the corresponding mechanical function.

THE DRAWINGS AND DETAILED DESCRIPTION OF THE INVENTION

The present invention is concerned with transducers whereby a linear mechanical function is transformed to an analogous electrical function and vice versa.

Figure 1:
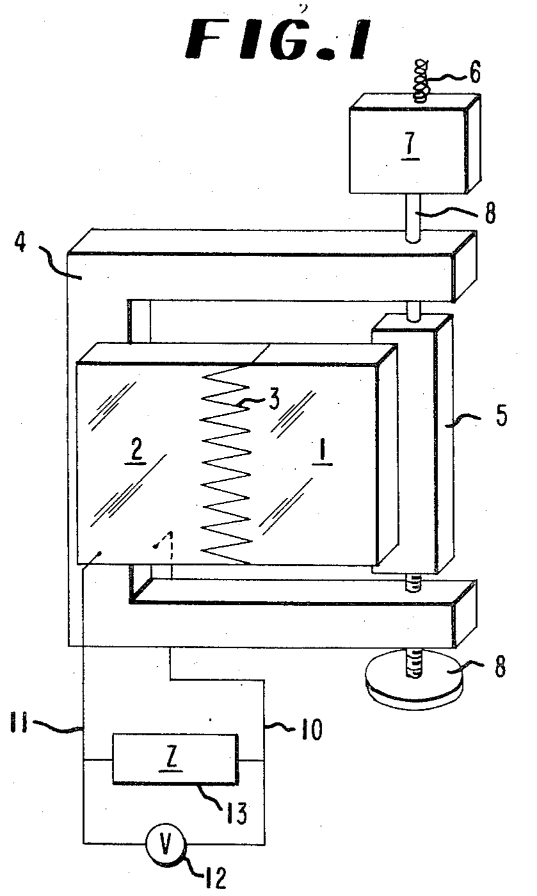
FIG. 1 is a sketch of a transducer of the present invention.

It is well known that the varying mechanical and electrical systems can be described by the same differential equations, where the following electrical and mechanical values are equivalent.

| Mechanical | | Electrical | |
|---|---|---|---|
| Mass | M | Inductance | L |
| Stiffness | K | Elastance | $S=1/c$ |
| Damping | R | Resistance | R |
| Force | F | Potential | V |
| Displacement | $x$ | Charge | $q$ |
| Velocity | $V=\dot{x}$ | Current | $i=\dot{q}$ |
| Acceleration | $\ddot{x}$ | — | $\ddot{q}$ |

The present invention utilizes the face that when a domain wall in a crystal plate of a coupled ferroelectric/-ferroelastic crystal is displaced by mechanical deformation of the crystal, the spontaneous polarization changes sign over an area proportional to the displacement of the domain wall. If the faces intersecting the axis of spontaneous polarization are electroded, a charge will be created on the electrodes, opposing the change of virtual charge in the plate, which is proportional to the displacement. By connecting an electrical circuit across the plate wherein the mechanical constants of the differential equation of motion are replaced with their electrical impedance analogs, a voltage is generated across the electrical impedance which measures the mechanical function. Conversely, a voltage applied across the electrical impedance will generate the mechanical function.

The above system is not ideal in that a minimum force and a corresponding minimum field must be applied before any domain wall motion occurs. This is equivalent to the coercive force in magnetism, and can be referred to as the coercive force or coercive field for mechanical and electrical switching, respectively. Provided the coercive force or field is exceeded, the system will operate in an ideal manner as will become apparent hereinafter.

A secondary departure from the ideal is in the finite mass of the crystal (and associated connection to the mechanical system) the finite electrical properties and more particularly, in the finite maximum velocity of wall motion. The latter is partially overcome by the use of a zigzag domain wall, which increases the maximum switching velocity by a factor of about 30–40. Zigzag domain walls are disclosed in the copending, commonly assigned patent application of R. B. Flippen, U.S. Pat. Ser. No. 318,502, filed Dec. 26, 1972 now U.S. Pat. No. 3,799,648 issued Mar. 26, 1974.

Finally, the introduction of the electrical circuit across the electroded crystal and the generation of voltage therein in response to mechanical current introduces mechanical forces opposing the motion of the mechanical system. This can be minimized, if necessary, by the suitable selection of circuit parameters, and in any event is a calculable effect.

Referring now to the Drawings:

FIG. 1 shows a transducing device according to the present invention. A plate of a coupled ferroelectric/-ferroelastic material exhibiting uniaxial properties, such as $\beta'$-gadolinium molybdate, is divided into two domains, 1 and 2, by a zigzag domain wall, 3. The edges intersected by domain wall 3 are parallel so that motion of the domain wall in a direction parallel to those edges switches an area of the crystal proportional to the displacement of the domain wall. The crystal is equipped with electrodes on the faces thereof which can, but need not be transparent electrically conductive electrodes such as tin oxide or indium oxide electrodes deposited by sputtering on the faces of the crystal. In order to more clearly show the invention, the electrodes are not depicted in the drawings. The electroded crystal is cemented to a fixed clamp 4 at one edge, the cement line being parallel to the line formed by the tips of the zigzag wall. The clamp is preferably affixed after wall 3 has been formed in a suitably poled crystal. The crystal plate is placed on the clamp 4 in the desired position, then a hardenable liquid cement which does not shrink on hardening such as cement of the $\alpha$-cyanoacrylate type, is applied to the edge of the crystal adjacent the clamp and allowed to flow between the crystal and the clamp by capillary attraction. The cement is then hardened. Clamp 4 serves to keep the zigzag domain wall from moving out of the crystal, and also as a support. The opposite edge of the crystal is likewise cemented to a light, rigid, clamping strip 5. A mechanical system symbolized by spring 6 and mass 7 is coupled to clamp 5 by a rigid rod 8 sliding through a hole in clamp 4. Screw 9 in clamp 4 serves as an adjustable stop to prevent excessive motion and possible breakage of the crystal. The electrodes are connected by wires 10 and 11 to a voltmeter 12 across an impedance 13 indicated by the box Z.

Not all ferroelastic/ferroelectric crystals will function in the present invention. In the first place, the ferroelectric and ferroelastic phases must be coupled, and in the second place, from the point of view of a transducer, it is essential to use crystals which can have domain walls confined to a set of planes all parallel to one axis. In order for a coupled ferroelectric/ferroelastic crystal to have such planar domain walls, the crystal must behave uniaxially; that is, the electric polarization must be constrained to lie in one direction or the other along a specific axis. In addition to this, in the most useful crystals, the planar domain walls occupy only a finite number of specific orientations within the crystal, and they must be capable of being moved in a controlled manner by external control of the electric field or mechanical stress configurations. For the purposes of this invention, therefore, the crystal used as the transducer must be a coupled ferroelectric/ferroelastic single crystal exhibiting uniaxial electric polarization.

The most well known crystal exhibiting all of these features is $\beta'$-gadolinium molybdate. There are, however, a large number of other crystals which are useful in the present invention. Using group theoretical analysis, such as that developed and discussed by L. A. Shuvalov in his article on "Symmetry Aspects of Ferroelectricity" in the Journal of the Physical Society of Japan (28 Supplement, 38, 1970) and by K. Aizu in his article on "Possible Ferroelectric and Ferroelastic Crystals and of Simultaneous Ferroelectric and Ferroelastic Crystals" in the same Journal (27, 387, 1969), the following table (Table I), which lists the point group associated with all crystals that are useful in the present invention, has been developed.

TABLE I

| 1<br>Allowed Aizu Groups for Reversible Ferroelectric-ferroelastic Materials | 2<br>Ferroelectric Polarization Axes, Referred to Symmetry Axes of Paraelectric Phase | 3<br>Number of Possible Polarization Axes | 4<br>Axes Normal to Useful Wall Planes, Referred to Symmetry Axes of Paraelectric Phase |
|---|---|---|---|
| UNIAXIAL | | | |
| $\bar{4}$2mFmm2 | $\bar{4}$ | 1 | 2 |
| $\bar{4}$F2 | $\bar{4}$ | 1 | 2 |
| 222F2 | $\bar{2}$ | 1 | 2 |
| MULTIAXIAL | | | |
| $\bar{4}$2mF2 | 2 | 2 | 2 |
| 422E2 | 2 | 2 | 2 |
| 622F2 | 2 | 3 | 2 |
| $\bar{4}$3mFmm2 | $\bar{4}$ | 3 | 2 |
| 23F2 | 2 | 3 | 2 |

In Table I, the first column specifies, in Aizu's notation, the paraelectric and ferroelectric phase point group symmetries above and below the Curie point, for all possible systems that fill the requirements listed above. In this notation, the point group written to the left of the "F" represents the point symmetry of the high temperature phase while that on the right represents the low temperature, ferroelectric phase. This in itself constitutes a complete list of useful crystals. The second column gives the electric polarization axes of the ferroelectric phase in terms of the symmetry axes of the paraelectric phase. The third column gives the number of such possible polarization axes. In the first three cases, unity indicates that the ferroelectric phase is uniaxial, as desired for this invention. In the remaining cases, the electric polarization can be directed in either sense along each of several axes, but material in these multiaxial classes will, nevertheless, be useful for this invention, if polarization along all except one of the allowed axes is suppressed. In the fourth column, the axes that are normal to the allowed domain wall planes are specified in terms of the paraelectric symmetry axes. In each case, the allowed domain wall must be perpendicular, corrected for small spontaneous crystal deformation $T_c$, to a two-fold rotation axis of the paraelectric phase.

By way of explanation, it should be noted that, in diffusionless phase transitions occurring in crystalline material, the point group of the low temperature phase must generally be a subgroup of the high temperature phase. To develop coupled ferroelastic/ferroelectric properties, the high temperature phase must possess a piezoelectric coefficient that has a finite component along the axis of polarization of the low temperature phase. Furthermore, the direction of polarization of the low temperature phase must be along the equivalent directions of the high temperature phase; that is, the possible directions of polarization of the low temperature phase must be convertible, one to another, by the symmetry operations of the high temperature group. The symmetry elements of the high temperature group that are missing in the low temperature group become the "twinning" elements of the low temperature crystal. Furthermore, the number of possible domain orientations is equal to the order (number of symmetry operations) of the paraelectric point group divided by the order of the ferroelectric point group. For the reversible ferroelectrics included in Table I, the number of domain orientations will always be even, as shown by column 4, since it is possible to direct the polarization in either sense along each of the allowed polarization axes, and each wall orientation will contain a polarization axis.

Since in the piezoelectric effect, the strain is an odd function of the polarization, the requirement for a finite piezoelectric coefficient along the axis of eventual polarization, mentioned above, means that, when the sign of the polarization is reversed, at least some of the mechanical lattice strains that occur because of the piezoelectric effect will also be reversed in sign. Therefore, the new Bravais lattice in the switched region of the crystal, although identical with the old Bravais lattice, cannot constitute a grid totally coincident with it without whole crystal movement. The new Bravais lattice will therefore be "non-collinear" (in the language of Shuvalov) with the old Bravais lattice, and the two lattices can, therefore, only remain joined without serious lattice distortion along certain common crystallographic planes. Furthermore, to preserve crystal continuity of a multi-domain coupled ferroelectric/ferroelastic crystal, the crystallographic axes of opposite domains must be differently oriented, which, in turn, requires whole domain motion. For example, in the case of gadolinium molybdate, the (110) planes approximately normal to a domain wall change orientation by 0.3° in the (001) plane at the domain wall. Where a domain wall is desired but does not exist, therefore, one can be produced by applying an external stress to the crystal to deform the crystal in the manner attendent upon the presence of the desired wall.

For purposes of the following discussion the term coupled ferroelectric/ferroelastic crystals exhibiting uniaxial electric polarization will be considered to be identical with the term ferroelectric/ferroelastic crystal exhibiting uniaxial electric polarization and having domains with non-collinear Bravais lattices. Both terms will include all the crystals in the following Aizu point groups: $\bar{4}$2mFmm2, $\bar{4}$F2, 222F2, $\bar{4}$2mF2, 422F2, 622F2, $\bar{4}$3mFmm2 and 23F2, all of which are listed in Table I. By definition the terms will also refer and be limited to these crystals in their ferroelectric state, i.e., in the state below their respective transition temperature. The preferred crystals come from the following uniaxial point groups listed in Table I: $\bar{4}$2mmFmm2, $\bar{4}$F2 and 222F2. A partial list of crystals known to exhibit a symmetry change that falls within the indicated Aizu point group is given in Table II.

TABLE II

| | |
|---|---|
| $\bar{4}$2mFmm2 | |
| | $Gd_2(MoO_4)_3$ |
| | $KH_2PO_4$ |
| 222F2 | |
| | $NaKC_4H_4O_6 \cdot 4H_2O$ |
| | $RbH_3(SeO_3)_2$ |
| 23F2 | |
| | $(NH_4)_2Cd_2(SO_4)_3$ |
| | $NH_3(CH_3)Al(SO_4)_2 \cdot 12H_2O$ |
| $\bar{4}$3mFmm2 | |
| | $M_3B_7O_{13}X$ |

wherein M is a cationic constituent, usually divalent, e.g. Mg and X is an anionic constituent, e.g. a halogen atom (but only when the structure indicated falls within the symmetry group $\bar{4}$3mFmm2).

The most well known crystals displaying coupled ferroelectric/ferroelastic behavior are crystals having the gadolinium molybdate structure falling into the class represented by the formula $(R_xR'_{1-x})_2 0_3 \cdot 3Mo_{1-e}W_e0_3$ wherein R and R′ represent scandium, yttrium or a rare earth element having an atomic number of from 57 to 71, $x$ is from 0 to 1.0, and $e$ is from 0 to 0.2. These crystals are described more fully in U.S. Pat. No. 3,437,432, issued to H. J. Borchardt on Apr. 8, 1969, and assigned to the assignee of the present invention. More specifically, it is the ferroelectric/ferroelastic phase, commonly referred to as the $\beta'$ phase of these gadolinium molybdate type materials, that exhibit coupled ferroelectric/ferroelastic behavior. Insofar as is necessary for a proper description of the present invention, the disclosure of both of these references is hereby incorporated into this specification. Crystals having the $\beta'$-gadolinium molybdate structure fall into the Aizu group $\bar{4}$2mFmm2. These materials display two orientations of domain walls which are normal to both two-fold rotation axes of the paraelectric group, $\bar{4}$2m. The electric polarization vector lies along the four-fold rotary inversion axis of the paraelectric phase in one or the other of the equivalent directions parallel thereto. These two directions are equivalent because they are interconverted by the two-fold rotation operations. Accordingly, these operations are lost as symmetry elements in going through the transition to the mm2 ferroelectric phase; and they become the "twinning" operations that interconvert the ferroelectric/ferroelastic domains.

The coupling of mechanical and electrical properties in the context of the present invention can be viewed as related to the piezoelectric coupling of polarization and strain through the piezoelectric stress coefficient $$(\delta P/\delta\gamma)_E = -(\delta Y/\delta E)\gamma = e$$

where E is electric field, Y is stress, $\gamma$ is strain and P is polarization. Hence in the ferroelectric/ferroelastic phase $$P_s/\gamma_s \approx e$$

where $P_s$ is the spontaneous polarization and $\gamma_s$ is the spontaneous strain.

For gadolinium molybdate, this quantity has the approximate value $6.45 \times 10^{-5}$ coul/cm², $2\gamma_s = \tan\theta \approx 0.0062$ where $\theta$ is the deflection of a (110) face at the intersection of a domain wall: $P_s \approx 0.2 \times 10^{-6}$ coulomb/cm². It has been discovered that for $\beta'$-gadolinium molybdate $P_s/\gamma_s$ is essentially independent of temperature in a range from below room temperature to the Curie temperature (159° C). Accordingly, transducers made using gadolinium molybdate as the transducing element are insensitive to temperature and form a preferred embodiment of this invention.

The transducer of the present invention further employs a zigzag domain wall. Such walls have been described in U.S. application Ser. No. 318,502, filed Dec. 26, 1972 of R. B. Flippen, commonly assigned to the assignee of the present invention. Zigzag domain walls can be formed in crystals having ferroelastic properties. Once formed, such walls are stable in the sense that they continue to exist in the absence of applied electrical and mechanical stress, and can be moved back and forth in the crystal as an entity by stress, and, in the case of coupled ferroelectric/ferroelastic crystals with which the present invention is concerned, by electrical fields. The general configuration of these walls is a zigzag formed by essentially planar domain walls lying close to but slightly angled from one of the crystallographic planes along which domain walls are theoretically possible, i.e., in crystals having the gadolinium molybdate structure, close to one of the (110) sets of planes. The walls intersect to form a zigzag wall in which the points of the zigzag lie along two planes perpendicular to the aforesaid plane. The general configuration of a zigzag wall is shown by 3 in FIG. 1.

Figure 2:
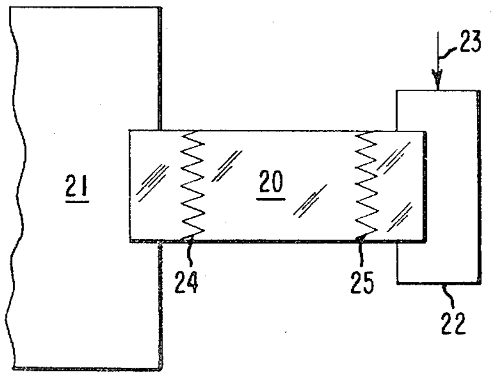
FIG. 2 illustrates a method of forming zigzag domain walls in a plate of a coupled ferroelectric-ferroelastic material.

FIG. 2 illustrates a method of forming zigzag domain walls in a coupled ferroelectric/ferroelastic crystal. A poled crystal equipped with electrodes such as a c-cut crystal plate of $\beta'$-gadolinium molybdate 20 is cemented at one end to a rigid clamping plate 21 and at the other end to a movable plate 22. The cement lines are oriented to follow the direction of permitted planar domain walls in the crystal, i.e., parallel to the (110) direction of a c-cut plate of $\beta'$-gadolinium molybdate. Pressure relative to 21 is then applied to clamp 22 parallel to the cement line as indicated by the arrow 23. After a certain critical stress is exceeded, which for $\beta'$-gadolinium molybdate is about 5 Kg/cm² or more, the exact value depending on the crystal, a pair of zigzag domain walls 24 and 25 are formed adjacent clamps 21 and 22, The clamps can then be removed by dissolving the cement and one of the walls can be expelled from the crystal by careful manipulation. The crystal can then be recemented in the desired apparatus, e.g., in the apparatus of FIG. 1.

The dimensions of the zigzag wall formed depends on the stress applied, the higher stress forming narrower zigzag walls. In general, the widths of the wall, i.e., essentially the length of the planes defining the walls are from 100 to 4,000 microns. The spacing between the tips of the zigzag hereafter termed the pitch *p* is also variable, and is generally between 5 and 160 microns. The ratio of pitch/width is less variable and generally lies between 0.05 and 0.15.

An important property of zigzag walls is that the mobility of the wall is increased by a factor of about 10 to 30 or more, of a normal planar domain wall, thus the use of zigzag walls in the transducer of the present invention gives 10 to 30 times or more greater sensitivity than can be obtained using a planar domain wall.

The increase in mobility appears to be due to a geometric factor, since the mobility of the planar segments forming the zigzag wall when moved perpendicular to the plane is approximately the same as for a conventional planar domain wall.

The mobility of the zigzag domain wall is given by the expression $$V_T = g\mu_T \ Y = g\mu_T \ (F/A),\ Y > Y_o$$

for a stress driven wall, where $\mu_T$ is the mobility of a planar wall; Y is the shear stress applied in dynes per square centimeter of crystal cross section parallel to the wall $Y_o$ is the coercive stress, *g* is a geometric factor for the zigzag wall and $V_T$ is the lateral velocity of the wall in cm/sec, F is the applied force and A is the crystal cross section.

A similar relationship applies when the wall is driven by an electrical field $$V_E = \mu_E gE = \mu Eg\ V/D,\ E > E_o$$

when E is the electrical field in volts/cm, V is the voltage, *d* is the sample thickness. For $\beta'$-gadolinium molybdate, the coefficient of mobility $\mu_E$ has been found to be 0.0214 cm²/volt second and $\mu_T$ is 0.032 cm³/gram second, with $$\mu E/\mu_T = 0.667 \text{ gram/volt sec.}$$

In the following the numerical quantities illustrative of this invention are given for $\beta'$-gadolinium molybdate.

The force exerted on rod 8 in FIG. 1 by a voltage V applied to the electrodes on the faces of crystal 1 can be found by equating the above two expressions, i.e., $$\mu_T \ g\tau = \mu_E gE$$

and using $$\tau = F/dW$$

and $$E = V/d$$

whence $$F = \mu_E EWV/\mu \quad = 0.667\ WV.$$

The force is independent of the displacement and the thickness of the crystal. For a crystal 1 cm in width W the force exerted is 667 gm for 1,000 volts.

The range of movement of rod 8 depends on the length of the crystal, and the strain coefficient; more particularly $$\Delta_s = 2\gamma_s\ \Delta L$$

where $\gamma_s$ is the spontaneous strain and ΔL is the length over which the wall travels. For a 1 cm length of wall travel $$\Delta s = 0.0062.$$

The charge, $\Delta q$, flowing is $2P_sW\Delta L$. For a 1 cm wide sample and wall travel of 1 cm, $$\Delta q = 4 \times 10^{-7} \text{ coulombs.}$$

Figures 3, 4:
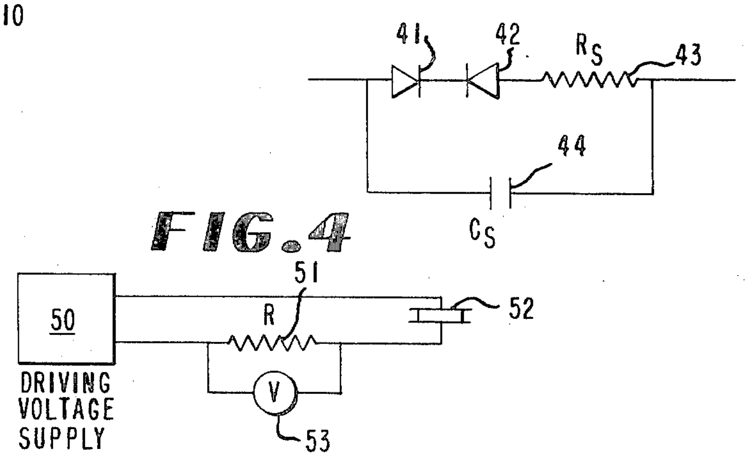
FIG. 3 shows the equivalent electrical circuit of an electroded plate of a coupled ferroelectric-ferroelastic material.
FIG. 4 shows a circuit for use with the transducer of FIG. 1 whereby a driving function can be applied to the mechanical system.

FIG. 3 shows an equivalent electrical circuit for an electroded ferroelectric/ferroelastic crystal. The crystal requires a finite electrical field before wall motion takes place which depends on the particular sample selected and on the thickness of the crystal, i.e., the distance between the electrodes. Typical values of field for gadolinium molybdate are from 400 to 1,000 volts/cm, depending on the degree of crystal perfection. This is represented in FIG. 3 by diodes 41 and 42 which conduct only when the breakdown voltage is exceeded.

Under the influence of a potential V, the wall will move at a velocity given by $$v_E = g\mu_E\ (V/d)$$

and a current will flow, given by $$dq/dt = 2P_sW\ v_E$$

whence $P_s$ (43), the effective impedance of the crystal is given by $$d/2gP_s\mu_E W.$$

For $\Delta L = 1$ cm, W = 1 cm, $d = 0.1$ cm, and $g = 30$, the effective impedance is $$\frac{d}{2(2\times10^{-7}\ \text{coulomb/cm.})^2\times1\ \text{cm.}\times30\times(0.02\ \text{cm.}^2/\text{volt sec.})} = 4.17\times10^5\ \text{ohms.}$$

The equivalent shunt capacity $C_s$ (44) of the circuit is $\sim15\mu\mu f$.

Turning now to the application of the device of FIG. 1, using a crystal of $\beta$-gadolinium molybdate 1 cm wide with permitted wall movement of 1 cm and 0.1 cm in thickness, the following applications, which are not exhaustive, are possible.

AS A MICROMETER WITH ELECTRICAL READOUT

The displacement $\Delta s$ of rod 8 causes a wall movement given by $\Delta L - \Delta s/2\gamma$ and a flow of charge $\Delta q = 2P_s\ \Delta L$. To measure this charge, a capacitor large in value compared with $C_s$ is used on the load. With the above values and using a capacitor of $1\mu F$ as Z in FIG. 1, the voltage will be $V = q/c$, or 3.2 millivolts/micron displacement, with a range of 124 micron or 0.4 volt. No significant difference of force with displacement occurs to create errors in the measurement.

AS A FORCE/VOLTAGE TRANSDUCER

In this application, Z can be an open circuit. A voltage V will produce a proportional force F independent of the displacement, provided this is within the limits of wall movement as explained hereinabove. Thus a constant force can be applied to a moving object.

VELOCITY/VOLTAGE.

The movement of rod 8 of the apparatus of FIG. 1 causes a current $dq/dt$ to flow between the electrodes of the crystal proportional to the velocity. If Z in FIG. 1 is a resistance R, which is preferably small in value coupled with $Rs$, the voltage developed across R will measure the velocity of rod 8, the sign of the voltage indicating the direction of the motion.

Specifically, the wall moves a distance $\Delta L$ when the rod moves $\Delta S$ given by:

$$\Delta L = \Delta S/2\nu_s$$

and the current generated by the wall motion in given by:

$$i = dq/dt = 2P_sW\ (dL/dt) = (P_s/\gamma_s)\ W\ (ds/dt).$$

Taking $g$ as 30, and rod 8 moving at 10 cm/sec, the current generated is $3.22 \times 10^{-4}$ amps and for a 1 cm wide crystal Rs is about $10^5\Omega$. Using a load resistance $R << Rs$ of $100\Omega$, voltage generated is 32.3 mV, which is readily measured, but does not substantially disturb the mechanical system. The velocity of the wall under this condition is about 800 cm/sec.

ACCELERATION/VOLTAGE

If Z is composed of an inductance, the voltage generated across the inductance is given by $$L(di/dt) = L(d^2q/dt^2).$$

Thus this voltage is a means of the acceleration of the rod 8 of FIG. 1.

The above functions do not exhaust the possibilities. For example, mechanical functions may be employed in conjunction with the electrical/mechanical transducer. As an example, a large mass M can be attached to rod 8. The force on rod 8 then measures the acceleration of the entire system. In another embodiment of the invention, a driving voltage can be applied and the response of the system to the mechanical force provided by the voltage can be used. A circuit suitable for this mode of operation is shown in FIG. 4, where the driving voltage is indicated by box 50. The voltage is applied to the electroded transducer ferroelectric/ferroelastic crystal through a series resistance R. Movement of the domain wall under the combined influence of the driving voltage and the mechanical load causes current to flow through R which is measured by the voltage V across R. The driving voltage can be constant or alternatively can be periodic such as a sine wave voltage.

Figure 5:
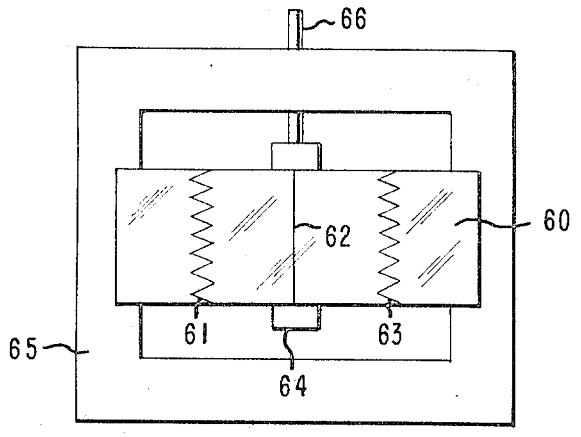
FIG. 5 shows an alternative form of transducer of the present invention employing two coupled ferroelectric-ferroelastic plates.

FIG. 5 shows another embodiment of this invention when a crystal 60 is divided into four domains by three domain walls, 61, 62 and 63. The central domain wall, 62, is fixed in the crystal by a central clamp 64 and can be simple planar domain wall or a zigzag domain wall. Domain walls 61 and 63 are zigzag domain walls which can be moved through the crystal. The ends of crystal 60 are connected to frame 65, which also forms a sliding bearing for rod 66 whereby the transducer can be connected to a mechanical system. Instead of a single crystal 60, divided by domain wall 62, two crystals can be employed, joined by cementing each to clamp 64. In any event, the crystal 60 (or crystals) is equipped on both faces with separate electrodes on each side of the central clamp.

Electrical connection can be made to the faces of one crystal (or one-half of the single crystal divided by wall 62 clamped by clamp 64) then cross connected to the electrodes on the opposite faces on the other side of clamp 64, so that the two crystals or two halves of a crystal act in concert to produce movement of rod 66 on application of a voltage to the electrodes or conversely to produce a flow of charge in correspondence with the movement of rod 66 through a mechanical function. Alternatively, one side of the crystal can then be employed to provide a mechanical driving function to rod 66, by application of a voltage to the electrodes and the other side can be employed as a transducer to measure in electrical terms the response of a mechanical system attached to rod 66.

The transducer of the present invention is inherently a high compliance device, however, the compliance can be modified by use of a feed-back driving voltage derived from the signal voltage to either increase or still further reduce the compliance.

The useful range of displacements, velocities, accelerations and forces can also be increased or diminished by use of a simple lever system connecting the transducer to the mechanical system.

What is claimed is:

1. An electromechanical transducer comprising a crystal plate of a coupled ferroelectric/ferroelastic material exhibiting uniaxial properties cut with faces essentially perpendicular to the plane of domain walls, said plate being divided into two domains by a zig-zag domain wall, said plate having an electrode on each opposing face of said plate;

a mechanical system coupled to said plate whereby displacement by said mechanical system moving said zig-zag domain wall;

said electrodes being connected in a circuit including a series electrical impedance corresponding to a selected mechanical function, whereby a voltage across said impedance is correlated with said mechanical function.

2. Device of claim 1 where said crystal plate is a crystal of a rare earth molybdate having the $\beta'$-gadolinium molybdate structure.

3. Device of claim 1 where said crystal plate is a plate of $\beta'$-gadolinium molybdate.

4. Device of claim 3 where said impedance is a resistance, and said voltage is proportional to the velocity of displacement.

5. Device of claim 4 where said resistance has a value substantially less than the equivalent resistance of the electroded plate.

6. Device of claim 3 where said impedance is a capacitor and said voltage is proportional to the mechanical displacement.

7. Device of claim 6 where said capacitance has a value substantially greater than the equivalent capacitance of the electroded crystal plate.

8. Device of claim 3 where said impedance is an inductance and said voltage is proportional to the mechanical acceleration applied to said plate.

9. Device of claim 8 wherein said inductance has an impedance substantially less than the equivalent resistance of the electroded plate.

* * * * *

UNITED STATES PATENT OFFICE
CERTIFICATE OF CORRECTION

PATENT NO. : 3,851,192

DATED : November 26, 1974

INVENTOR(S) : Richard B. Flippen and Edward M. Hogan

It is certified that error appears in the above-identified patent and that said Letters Patent are hereby corrected as shown below:

Col. 4, line 61 between "deformation" and "$T_c$" insert --below--.

Col. 5, line 64 "$\bar{4}$2mmFmm2" should be --$\bar{4}$2mFmm2--.

Col. 6, line 22 - the formula is hyphenated in a rather peculiar manner, i.e., the one subscript is hyphenated.

Col. 8, line 10 between "wall" and "$\gamma_o$" insert --,--.

Col. 8, line 16 "$V_E = \mu_E gE = \mu Eg\ V/D, E>E_o$" should be --$V_E = \mu_E gE = \mu_E g\ V/d, E>E_o$--.

Col. 8, line 23 "$\mu E/\mu \tau$" should be --$\mu_E/\mu_\tau$--.

Col. 8, line 40 - "$F = \mu_E EWV/\mu$" should be --$F = \mu_E WV/\mu_\tau$--.

Col. 8, line 53 "0.0062." should be --0.0062 cm.--.

Col. 9, line 10 "$P_s$" should be --$R_s$--.

Col. 10, line 10 "means" should be --measure--.

Col. 11, line 13 "moving" should be --moves--.

Signed and Sealed this

*second* Day of *March 1976*

[SEAL]

*Attest:*

RUTH C. MASON
*Attesting Officer*

C. MARSHALL DANN
*Commissioner of Patents and Trademarks*